(12) United States Patent
Yukawa (10) Patent No.: US 7,703,858 B2
(45) Date of Patent: Apr. 27, 2010

(54) TIRE NOISE REDUCING SYSTEM

(75) Inventor: Naoki Yukawa, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 0 days.

(21) Appl. No.: 12/340,347

(22) Filed: Dec. 19, 2008

(65) Prior Publication Data

US 2009/0134694 A1 May 28, 2009

Related U.S. Application Data

(62) Division of application No. 11/136,408, filed on May 25, 2005, now abandoned.

(30) Foreign Application Priority Data

Jun. 14, 2004 (JP) ............................. P2004-175808

(51) Int. Cl.
*B60B 19/00* (2006.01)
*B60C 19/00* (2006.01)
(52) U.S. Cl. .................................. 301/6.91; 152/154.1
(58) Field of Classification Search ................ 301/6.91; 152/153, 154.1, 516, 520
See application file for complete search history.

(56) References Cited

U.S. PATENT DOCUMENTS

| | | | |
|---|---|---|---|
| 6,579,389 B1 | 6/2003 | Kobayashi et al. | |
| 6,581,658 B2 | 6/2003 | Nakajima et al. | |
| 6,598,636 B1 | 7/2003 | Schumann et al. | |
| 6,726,289 B2 | 4/2004 | Yukawa et al. | |
| 6,755,483 B2 | 6/2004 | Yukawa et al. | |
| 6,886,616 B2 * | 5/2005 | Akiyoshi et al. ......... | 152/154.1 |
| 7,013,940 B2 | 3/2006 | Tsihlas | |
| 2005/0155686 A1 | 7/2005 | Yukawa et al. | |

FOREIGN PATENT DOCUMENTS

| | | |
|---|---|---|
| EP | 63291708 | 11/1988 |
| EP | 0956980 A2 | 11/1999 |
| EP | 1510366 A1 | 3/2005 |
| WO | WO-03/103989 A1 | 12/2003 |

\* cited by examiner

*Primary Examiner*—Jason R Bellinger
(74) *Attorney, Agent, or Firm*—Birch, Stewart, Kolasch & Birch, LLP

(57) ABSTRACT

A tire noise reducing system comprises a wheel rim, a pneumatic tire and a noise damper disposed in the tire cavity and made from a spongy material whose total volume is in a range of from 0.4 to 20% of a volume of the tire cavity. The maximum thickness of the damper between the base end surface and the top end surface is in a range of from 1.0 to 4.5 cm. The width of the base end surface is more than the maximum thickness. The width of the damper is not increased in the direction from the base end surface to the top end surface, and each of side faces defined as extending from the edges of the base end surface to the edges of the top end surface is at least partially provided with an aslant portion inclined at an angle theta of from 30 to 75 degrees with respect to the base end surface. The damper is preferably fixed to the inside of a tread portion of the tire.

12 Claims, 12 Drawing Sheets

FIG.9(A)
Ref.2

FIG.9(B)
Ref.3

TIRE NOISE REDUCING SYSTEM

This application is a Divisional of co-pending application Ser. No. 11/136,408, filed on May 25, 2005, the entire contents of which are hereby incorporated by reference and for which priority is claimed under 35 U.S.C. § 120.

The present invention relates to a tire noise reducing system, more particularly to a noise damper disposed in the tire cavity.

Noise generated from a tire rolling on a road surface is analyzed into many kinds of sound according to the causes and sources. For example, a resonance of air in the annular tire cavity causes so called road noise which sounds like $-GHOe1$ and the power spectrum ranges from about 50 to 400 Hz.

It is well known in the tire art that a noise damper made of a spongy material disposed in a tire cavity can damp the air resonance.

Figure 17:
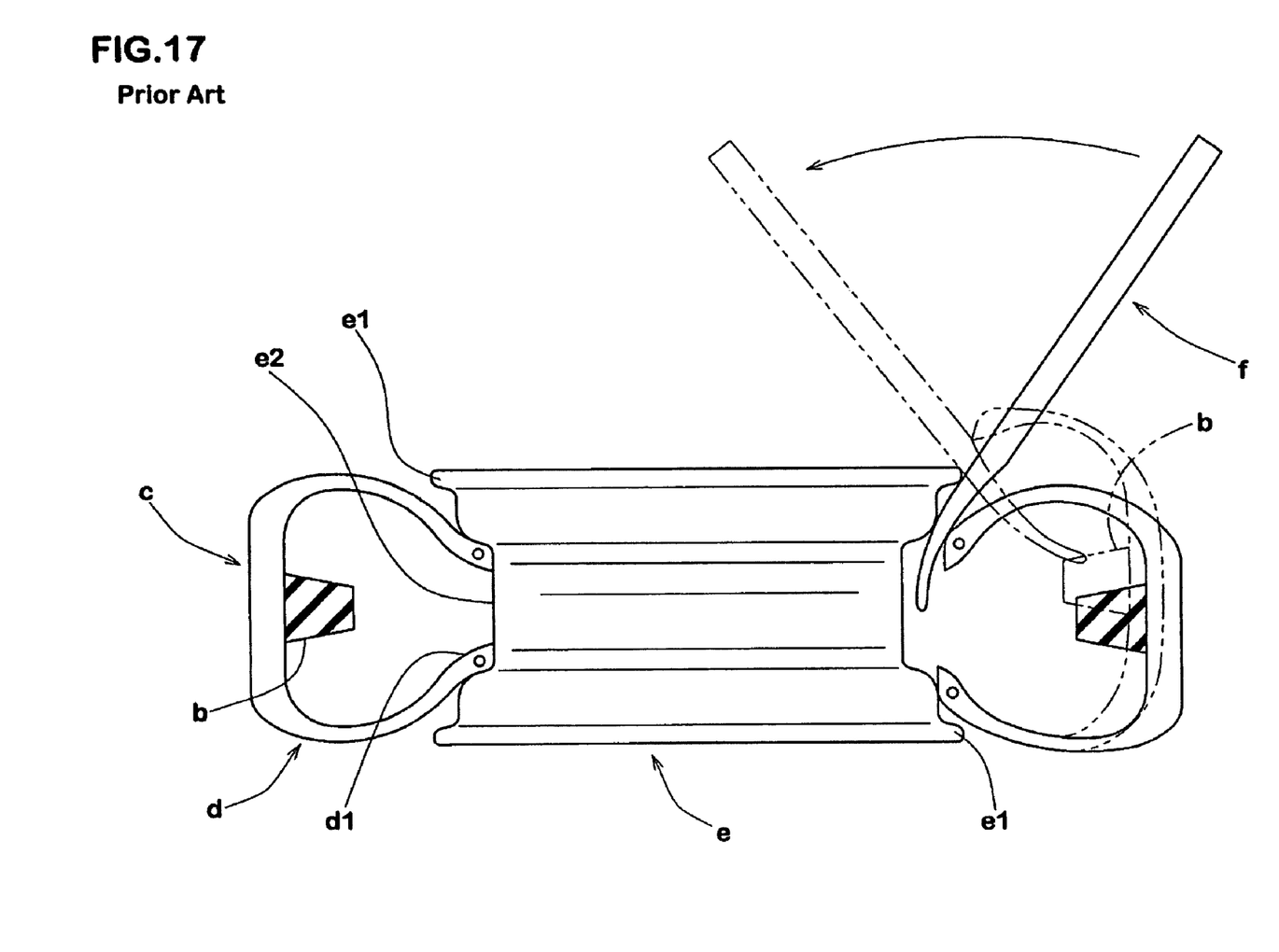
FIG. 17 is a schematic cross sectional view for explaining the use of a tire lever when demounting a tire from the wheel rim.

For example, in the Japanese patent application publication No. 2002-164791, as shown in FIG. 17, a strip (b) of a spongy material is adhered to the inside of the tread portion (c) of a pneumatic tire (d).

This tire (d) can be mounted on a wheel rim (e), following conventional ways, namely, placing the bead portions (d1) in the rim well (e2), pressing the outside of the sidewall portion so that the bead portions get across the rim flange $_{(e1)}$, and filling air to seat the bead portions on the bead seats of the rim. Thus, at the time of mounting the tire on a rim, the size and shape of the damper hardly become problems.

Also, this tire (d) can be demounted or removed from the wheel rim (e), following conventional ways, namely, deflating the tire, pressing the outside of the sidewall portion so that the bead portions fall in the rim well (e2), and getting the bead portions across the rim flange using a tire lever (f) inserted as shown in FIG. 17.

Thus, at the time of demounting the tire, depending on the workers or techniques, there is a high possibility that the damper is damaged or separated from the tire by the inserted tire lever (f).

Therefore, in order to solve such problems, the inventor conducted a tire demounting test.

In the test, using a conventional tire changer (not shown) and a tire lever (f) as shown in FIG. 17, workers who were previously not informed of the presence of the damper demounted various tires from the wheel rims, wherein the tires having various aspect ratios and dampers having various thicknesses were used. From the test results it was discovered that when demounting the tire, the tire lever (f) is inserted into the tire hollow with various insert lengths, and the insert length varies depending on the tire size, tire category, aspect ratio and the like of the tire. Also, the insert length varies depending on the worker's technique and habit. However, surprisingly, the damage could be fully prevented or greatly reduced when the thickness of the damper was in a range of 1.0 to 4.5 cm. The reason therefor is probably as follows. According to the worker's common knowledge to prevent the tire lever (f) from contacting with the tire inner surface, the maximum insert lengths are limited to a certain value (upper limit) although the maximum insert lengths show a variation on some level. As a result, the contact with the damper 4 is prevented.

It is therefore, an object of the present invention to provide a tire noise reducing system, in which, based on the above-mentioned discovery of the effective thickness limitation, the damage and separation of the damper at the time of demounting the tire can be further effectively prevented.

According to the present invention, a tire noise reducing system includes a wheel rim, a pneumatic tire mounted on the wheel rim and forming a tire cavity, and a noise damper disposed in the tire cavity and made from a spongy material whose total volume is in a range of from 0.4 to 20% of a volume of the tire cavity, wherein in a tire meridian section, a maximum thickness of the damper between the base end surface and the top end surface is in a range of from 1.0 to 4.5 cm, the width of the base end surface is more than the maximum thickness, the width of the damper is not increased in the direction from the base end surface to the top end surface, and each of the side faces defined as extending from the edges of the base end surface to the edges of the top end surface is at least partially provided with an aslant portion inclined at an angle theta of from 30 to 75 degrees with respect to the base end surface, wherein the aslant portion includes a concavely curved part and/or a convexly curved part.

Embodiments of the present invention will now be described in detail in conjunction with the accompanying drawings, wherein.

Figure 1:
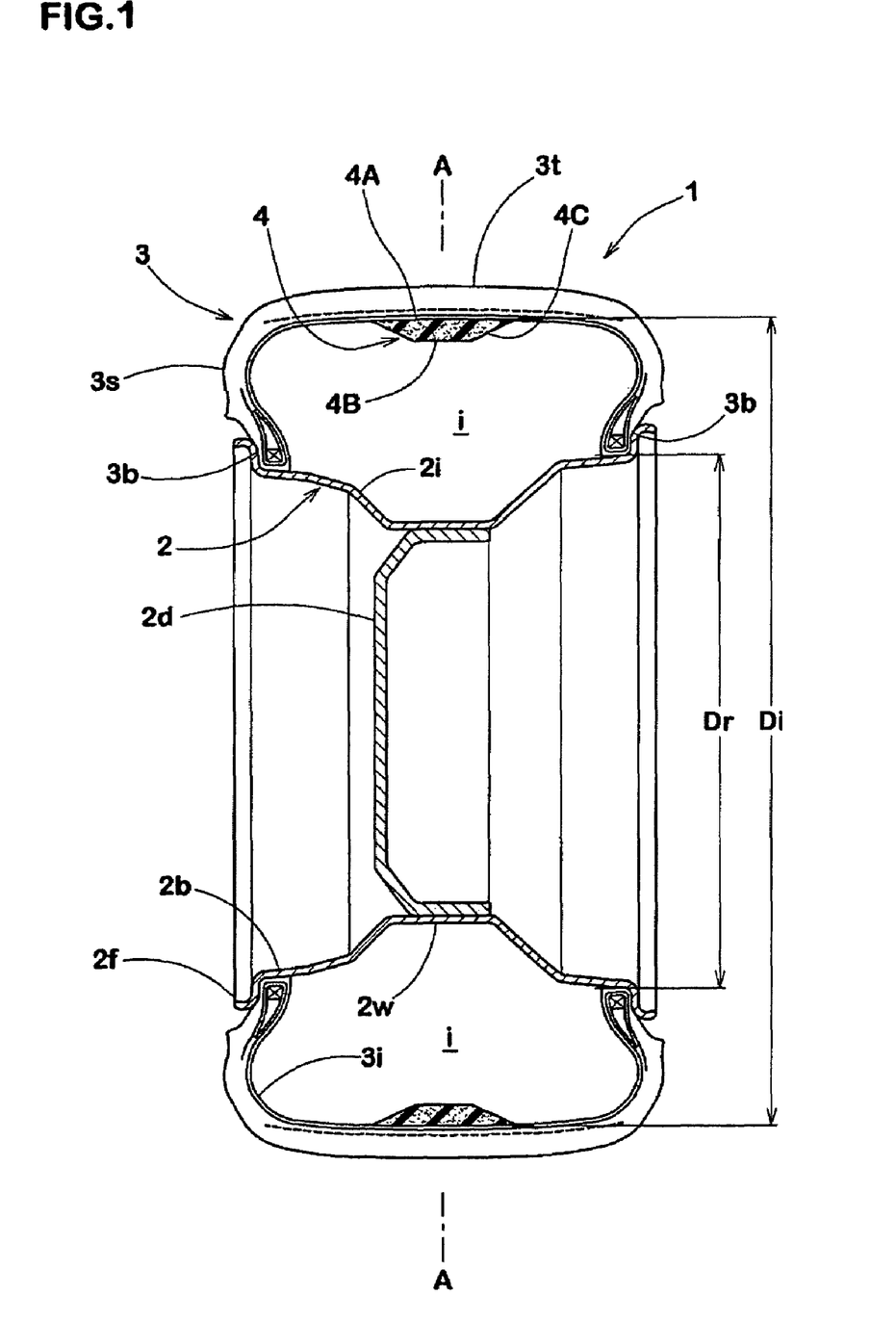
FIG. 1 is a cross sectional view of a tire/rim assembly according to the present invention.
Figure 2:
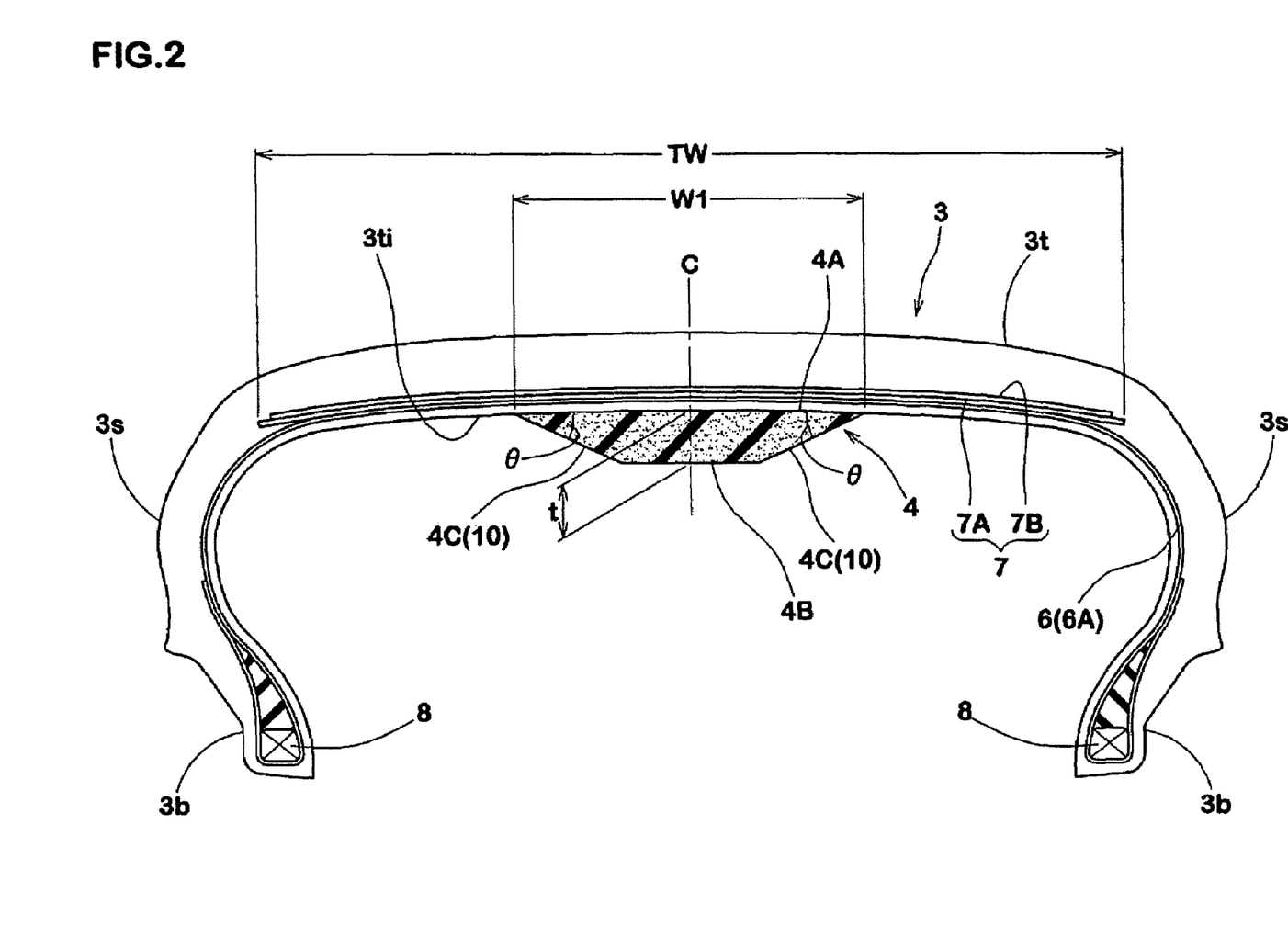
FIG. 2 is a cross sectional view of the tire in a state not mounted on a wheel rim.

According to the present invention, a tire noise reducing system 1 comprises a wheel rim 2, a pneumatic tire 3 mounted thereon, and a noise damper 4 disposed in a tire cavity (i).

The tire 3 has a tread portion 3t having an outer surface defining the tread face or ground contacting surface and an inner surface, a pair of sidewall portions 3s, and a pair of axially spaced bead portions 3b so as to have a toroidal shape and an annular tire hollow. The tire is provided with a radial ply carcass 6, and a belt 7 disposed radially outside the carcass in the tread portion 3t.

In this embodiment, the tire is a tubeless radial tire for passenger cars, and the aspect ratio is not more than 50%. Thus, the tire section height is relatively low.

The carcass 6 comprises at lest one ply 6A of organic fiber cords turned up around the bead core 8 in each bead portion. In this example the carcass is made up of only one ply 6A.

The belt 7 comprises two cross plies (a radially inner ply 7A and a radially outer ply 7B) each made of parallel cords laid at an angle of from about 10 to about 30 degrees with respect to the tire equator C. In this example the belt is composed of only two plies 7A and 7B, which are made of steel cords. According to need, a band can be disposed radially outside the belt 7.

The wheel rim 2 comprises a pair of bead seats 2b for the tire beads 3b, a pair of flanges 2f extending radially outwardly from the bead seats 2b, and a rim well 2w between the bead seats 2b for tire mounting. In this example, the wheel rim 2 is fixed to a center section 2d (spoke or disk) attached to the vehicle's axle and forms a two-piece wheel. Of course the rim 2 may be a part of a one-piece wheel.

The wheel rim 2 may be a specially-designed rim, but in this embodiment, a standard wheel rim is used. Here, the standard wheel rim is a wheel rim officially approved for the tire by standard organization, i.e. JATMA (Japan and Asia), T&RA (North America), ETRTO (Europe), STRO (Scandinavia) and the like.

Incidentally, the standard pressure and the standard tire load are respectively defined as the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "inflation Pressure" in ETRTO, the maximum pressure given in the "Tire Load Limits at various Cold Inflation Pressures" table in TRA or the like. The standard load is the "maximum load capacity" in JATMA, the "Load Capacity" in ETRTO, the maximum value given in the above-mentioned table in TRA or the like. In the case of passenger car tires, however, the standard pressure and standard tire load are uniformly defined by 200 kPa and 88% of the maximum tire load, respectively.

The tire 3 is mounted on the wheel rim 2 and an annular cavity (i) is formed as the tire hollow closed by the rim.

The noise damper 4 may be fixed to the tire or rim by bonding its base end surface 4A to the inner surface of the tire or the inner surface of the rim which surfaces face the cavity (i).

In this embodiment, as the tire bead portions are very liable to contact with the inner surface 2i of the rim when mounting/demounting the tire, it is desirable that the damper 4 is attached to the inner surface of the tire. Thus, the damper 4 is fixed to only the tire. In other words, the noise damper 4 does not include one fixed to the rim.

In order to convert vibration energy into heat energy, a material having a large hysteresis loss or internal friction is preferably used. On the other hand, to deform easily during running and not to affect the running performance such as steering stability, the material of the damper to be fixed to the tire must be a light-weight low-density flexible material such as formed rubber, foamed synthetic resins, cellular plastics, and bonded-fiber material formed by loosely bonding fibers (incl. synthetic or animals' or plant fibers). In the case of foamed materials in particular, an open-cell type and a closed-cell type can be used, but an open-cell type is preferred.

In this embodiment, the damper 4 is made from a spongy material. Synthetic resin sponges such as ether based polyurethane sponge, ester based polyurethane sponge, polyethylene sponge and the like; rubber sponges such as chloroprene rubber sponge (CR sponge), ethylene-propylene rubber sponge (EDPM sponge), nitrile rubber sponge (NBR sponge) and the like are preferably used. Especially, polyethylene sponge, polyurethane sponges including ether based polyurethane sponge and the like are preferably used in view of noise damping effect, lightness in weight, easy control of expansion rate and durability.

If the specific gravity is too small, it is difficult to control the air resonance. If the specific gravity of the spongy material is too large, it is difficult to constrict the increase in the tire weight. Therefor, the specific gravity of the damper material is preferably set in a range of not less than 0.005, more preferably not less than 0.010, but not more than 0.06, more preferably not more than 0.03, still more preferably not more than 0.02.

Figure 4:
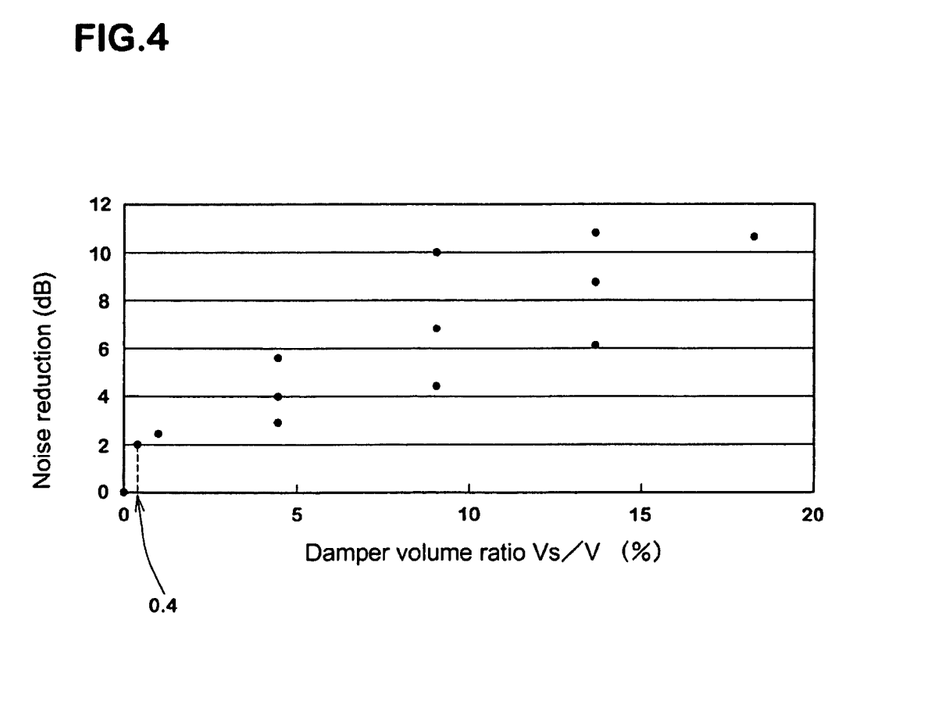
FIG. 4 is a graph showing a relationship between the total volume of the damper and the noise reduction.

FIG. 4 shows results of a test wherein the road noise was measured by changing the total volume of the damper disposed in the cavity. As show in this figure, by setting the damper volume more than 0.4%, a noise reduction of at least about 2 dB may be obtained. But, even if the volume is increased over 20%, the noise reduction hits the peak, and the cost and weight are increased. Thus, the total volume Vs of the damper 4 is set in the range of more than 0.4%, preferably more than 1%, more preferably more than 2%, still more preferably more than 4%, but less than 20%, preferably less than 10% of the volume v of the cavity (i).

Incidentally, the volume v of the cavity (i) can be obtained by the following approximate expression (1):

$$V = A \times \{(Di-Dr)/2 + Dr\} \times pi$$

wherein

"A" is the cross sectional area of the cavity (which can be obtained by computed tomography scan for example), "Di" is the maximum diameter of the cavity, "Dr" is the wheel rim diameter, and "pi" is the circle ratio.

These parameters are measured under the normally-inflated unloaded state of the tire.

Here, the normally-inflated unloaded state of the tire is such that the tire is mounted on the wheel rim and inflated to a normal pressure or the above-mentioned standard pressure but loaded with no tire load. In addition, a normally-inflated normally-loaded state is such that the tire is mounted on the wheel rim and inflated to the standard pressure and loaded with a normal load or the above-mentioned standard load.

The damper 4 is fixed to the tire by bonding its base end surface 4A to the inside 3ti of the tread portion or the ground contacting region so as to exist only within the width of the belt 7 in this example. In the case of a single damper, the center of the width W1 of the fixed base end surface 4A is aligned with the tire equatorial plane. In the case of plural dampers, they are arranged symmetrical about the tire equator.

Figure 3:
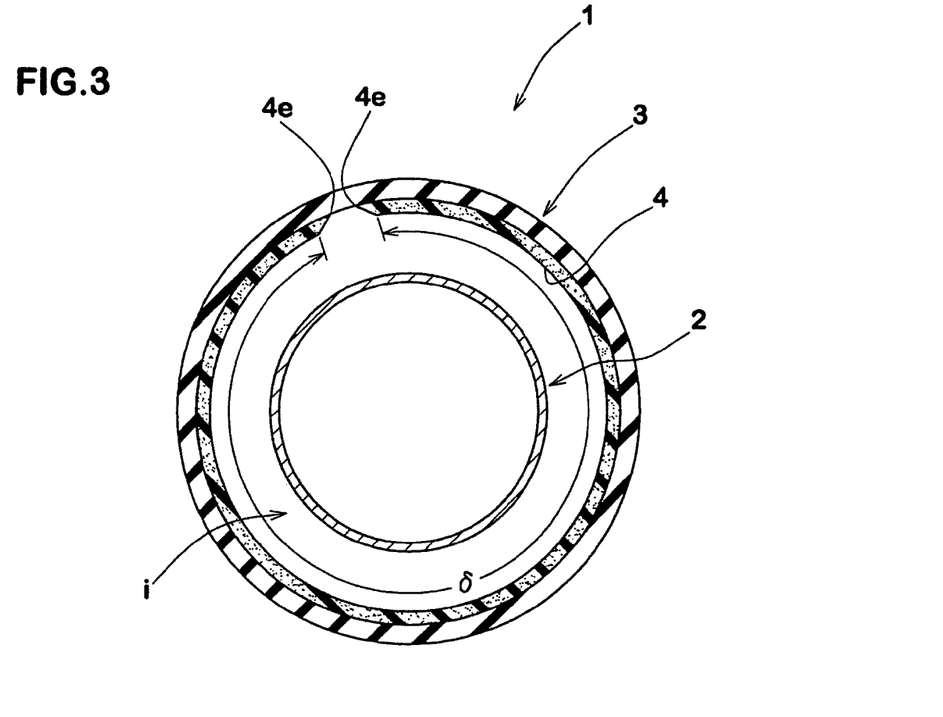
FIG. 3 is a schematic cross sectional view of the tire/rim assembly taken along the tire equatorial plane.

In FIG. 3, the circumferential ends 4e of the damper 4 are spaced apart from each other and a small gap is formed therebetween, but, it is also desirable that by connecting the ends 4e each other the damper is formed into a circumferentially continuous ring.

The damper 4 has a substantially constant cross sectional shape along the length thereof, excepting that when the circumferential ends 4e are not connected as shown in FIG. 3, the circumferential ends 4e are tapered not to rub with each other. The cross sectional shape is symmetrical about its center line with respect to the widthwise direction.

In the tire meridian section, the fixed base end surface 4A is formed by a substantially straight line. In this embodiment, the cross sectional shape of the damper 4 is symmetrical about the tire equatorial plane.

For the above reason, the damper 4 has a maximum thickness (t) in the range of from 1.0 to 4.5 cm and the fixed base end surface 4A has a width W1 larger than the thickness (t).

In the case of a passenger car radial tire, the width W1 of the fixed base end surface 4A is preferably set in a range of from 30 to 250 mm, more preferably 60 to 140 mm. Further, the width W1 is preferably in a range of from 5 to 100%, preferably 20 to 60% of the tread width TW.

Here, the tread width TW is the maximum axial width between the edges E (hereinafter the "tread edge") of the ground contacting area under the above-mentioned normally-inflated normally-loaded state. The thickness (t) and width W1 are measured at a normal temperature and atmospheric pressure in a state that the damper 4 is fixed to the tire 3 which is not mounted on the rim. The thickness t is measured perpendicularly to the fixed base end surface 4A. The width W1 is measured along the fixed base end surface 4A.

By setting the maximum thickness (t) within the range of 1.0 to 4.5 cm, a fatal damage may be prevented as explained above. But, in the case of the very low aspect ratio tires in particular, as the tire lever becomes liable to contact with the damper, it is difficult to completely stop the occurrence of the damage.

Therefore, in addition to the above-mentioned limitations, a further reform is made on the cross sectional shape, especially the side faces 4c of the damper. Here, the side faces 4c are defined as extending from both the axial edges of the fixed base end surface 4A to both the axial edges of the free top end surface 4B defining the maximum thickness (t).

According to the present invention, the side face 4c is at least partially provided with an aslant portion 10 on the top end surface 4B side.

Figure 5:
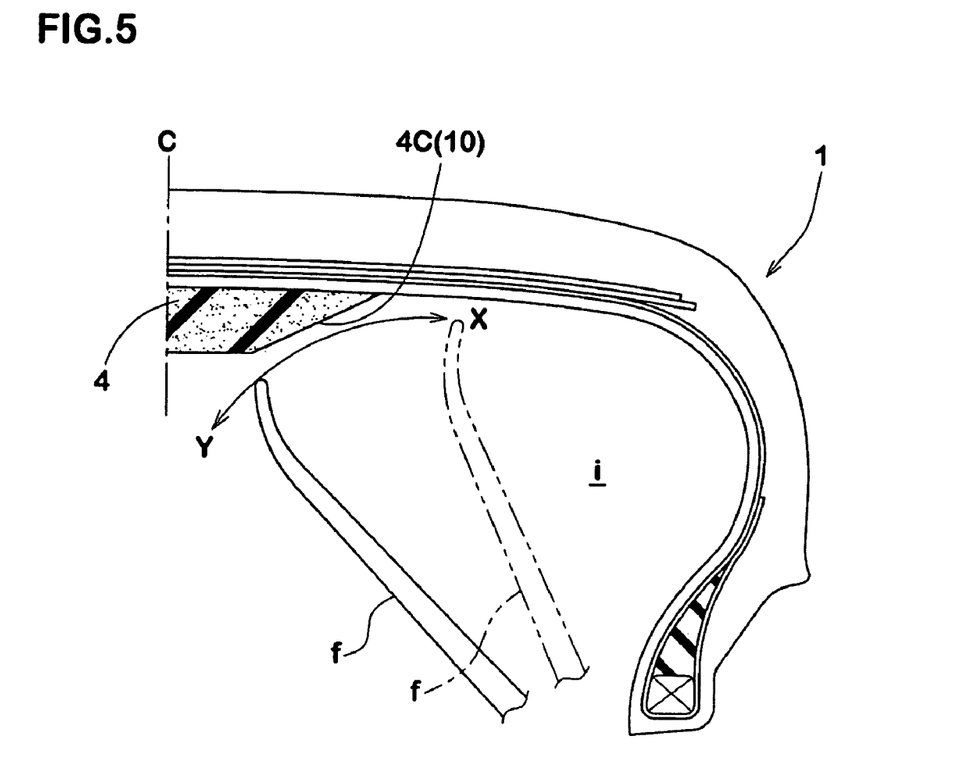
FIG. 5 is a cross sectional view showing the motion of a tire lever in the tire hollow.

The aslant portion 10 is inclined at an angle theta of from 30 to 75 degrees, preferably 30 to 70 degrees, more preferably 40 to 60 degrees with respect to the fixed base end surface 4A So that the damper is decreased in the width. By making the aslant portion 10, as shown in FIG. 5, a part which is liable to contact with the tip end of the tire lever (f) when demounting the tire 3, is removed. Accordingly, even in the low aspect ratio tires, the damage by the tire lever 3 can be effectively prevented.

By setting the angle theta as above, the contour of the aslant portion 10 becomes close to the curved line described by the tip end of the moving tire lever (f). Thus, even if a contact occurs, an inroad of the tire lever (f) into the damper 4 is decreased, and further the frictional force between the aslant portion 10 and the tire lever is reduced. Therefore, the damage of the damper and the separation of the damper 4 from the tire 3 can be effectively prevented.

Thus, it is essential that the width of the damper does not increases in the direction from the fixed base end surface 4A to the free top end surface 4B. For preventing the inroad of the tire lever, it is important that the end of each aslant portion 10 is connected to the edge of one of the top end surfaces 4B.

In FIG. 5, each of the side faces 4c is made up of the aslant portion 10 only, and the aslant portion 10 is substantially straight.

Figure 6:
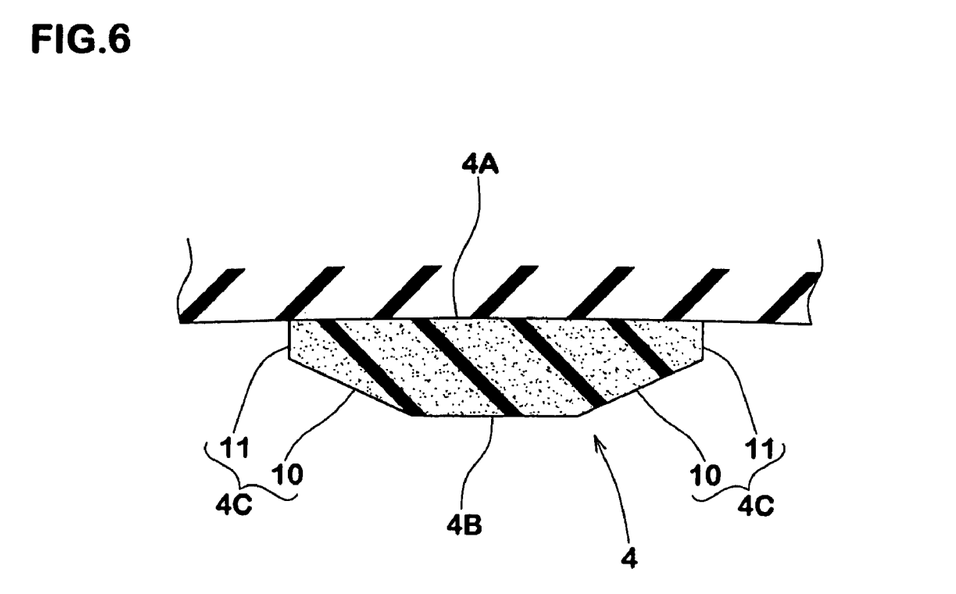
FIGS. 6, 7 and 8 are cross sectional views each showing another example of the damper.
Figure 7:
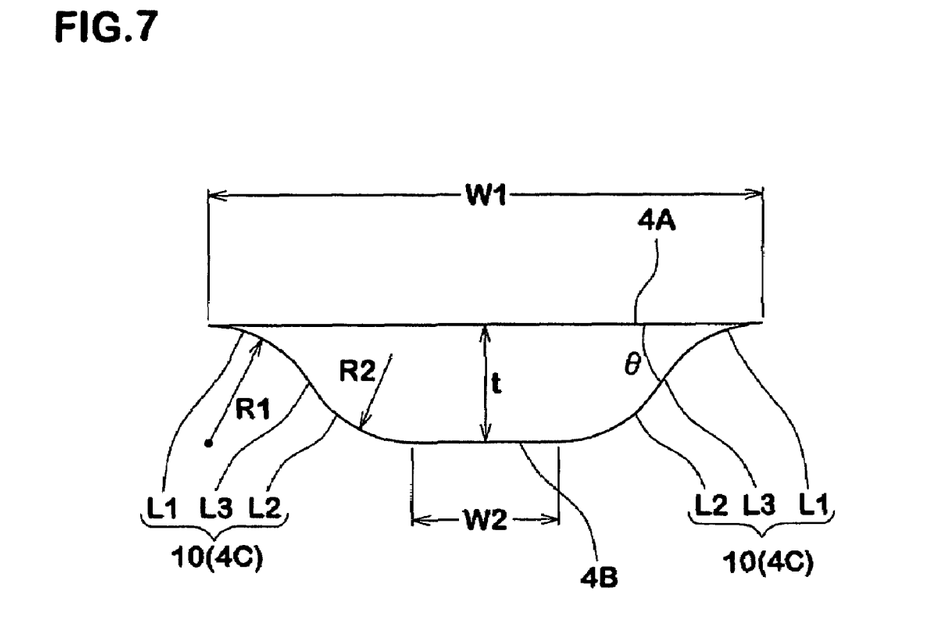

FIGS. 6 and 7 each show another example of the side face 4c of the damper.

In FIG. 6, in addition to the above-mentioned aslant portion 10, the side face 4C is provided with a vertical part 11 extending from the axial edge of the fixed base end surface 4A. Thus the side face 4c is made up of the aslant portion 10 in the angle range of 30 to 75 degrees and the vertical part 11 at substantially 90 degrees.

In FIG. 7, the aslant portion 10 is not straight. The aslant portion 10 in this example is made up of: a concavely curved part L1 having the center outside of the damper 4; a convexly curved part L2 having the center inside of the damper 4, and a straight part L3 therebetween which is relatively small in this example. The concavely curved part L1 is positioned on the base end surface 4A side, and the convexly curved part L2 is positioned on the top end surface 4B side.

By providing the side face 4c made up of such curved aslant portion 10 only, the concavely curved part L1 decrease the damper thickness to almost zero at the axial edges of the damper. Thus, the integrality of the damper 4 with the tire 3 and the adhesive strength may be improved.

The radius R1 of the concavely curved part L1 and the radius R2 of the convexly curved part L2 are preferably set in the range of more than 5 mm, more preferably more than 7 mm, still more preferably more than 15 mm. If the radius of curvature is less than 5 mm, it becomes difficult to effectively reduce the frictional force when contact. In order to derive the maximum effect from the curved face, it is preferred that the radii are at most about 150 mm.

Figure 11A:
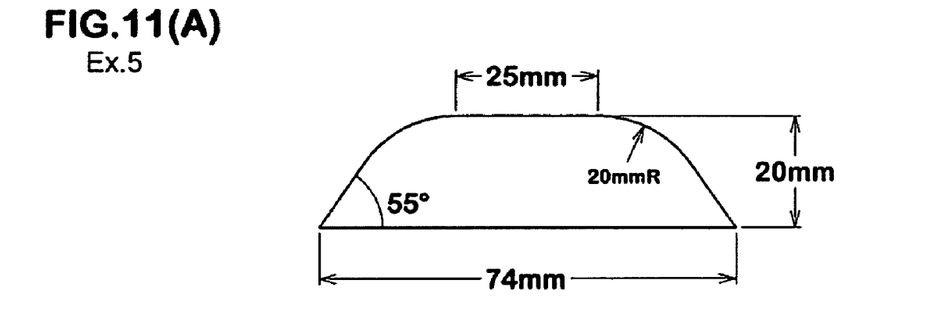
FIGS. 11(A), 11(B) and 11(C) show cross sectional views of dampers (Exs. 5, 6 and 7) used in the comparison tests.
Figure 11B:
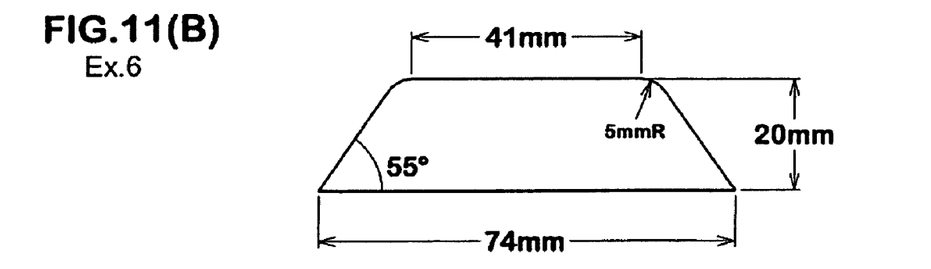
Figure 11C:
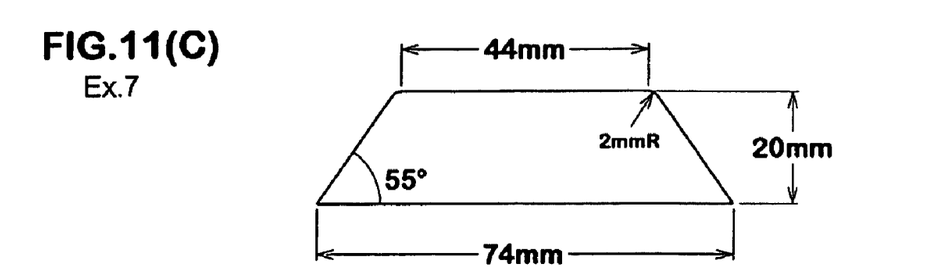
Figure 12A:
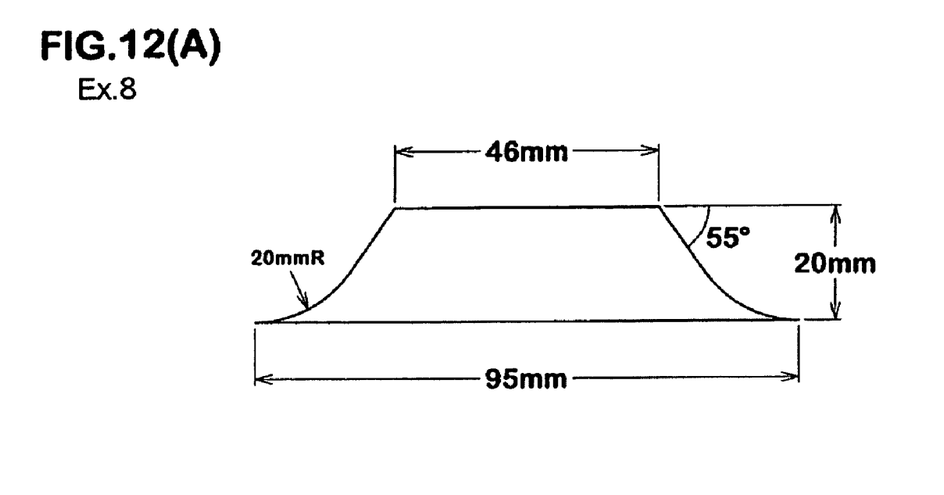
FIGS. 12(A), 12(B) and 12(C) show cross sectional views of dampers (Exs. 8, 9 and 10) used in the comparison tests.
Figure 12B:
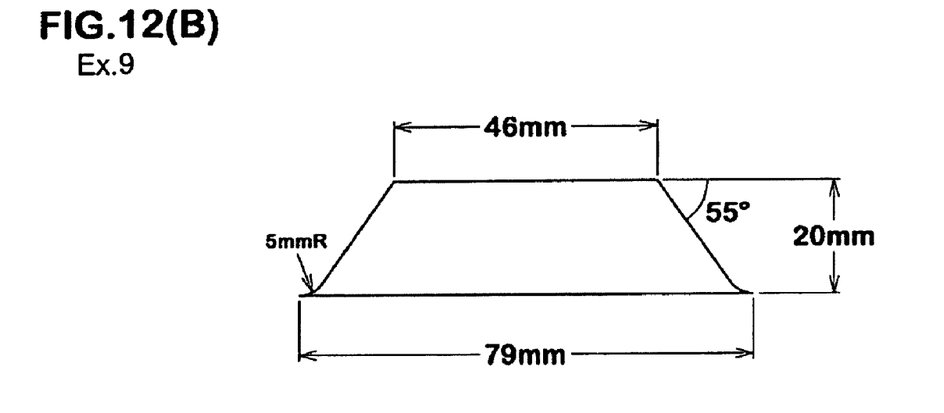
Figure 12C:
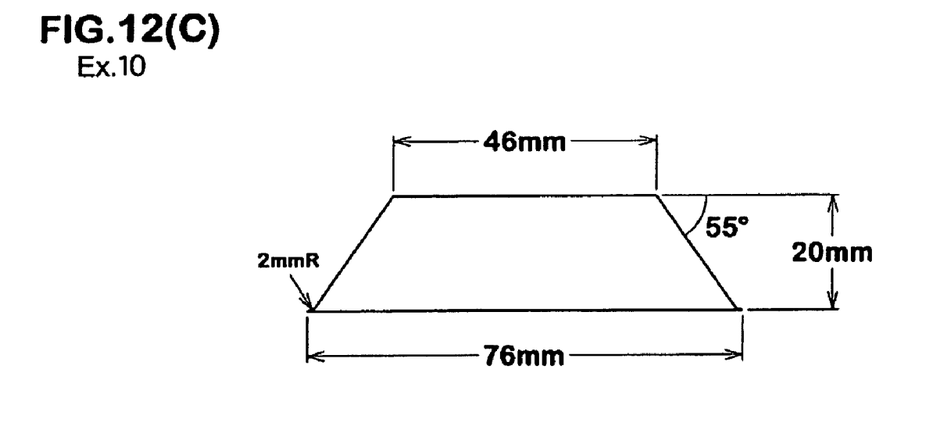
Figure 13A:
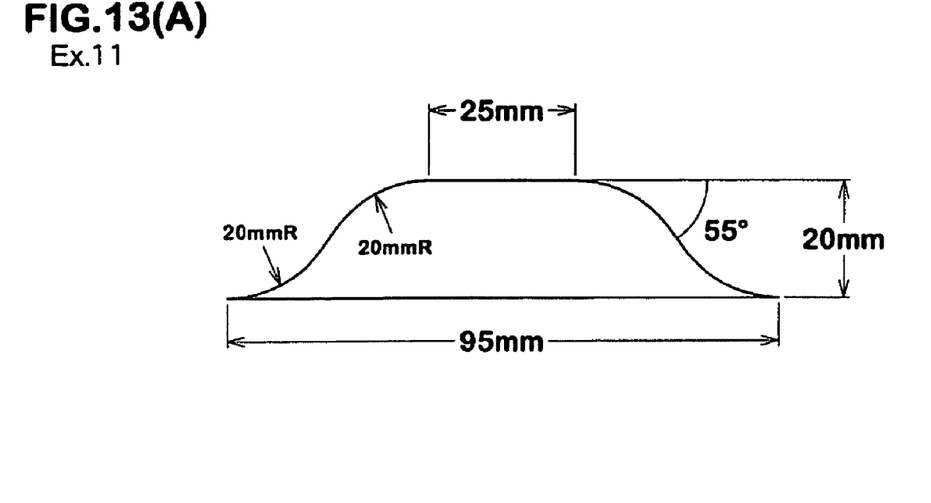
FIGS. 13(A), 13(B) and 13(C) show cross sectional views of dampers (Exs. 11, 12 and 13) used in the comparison tests.
Figure 13B:
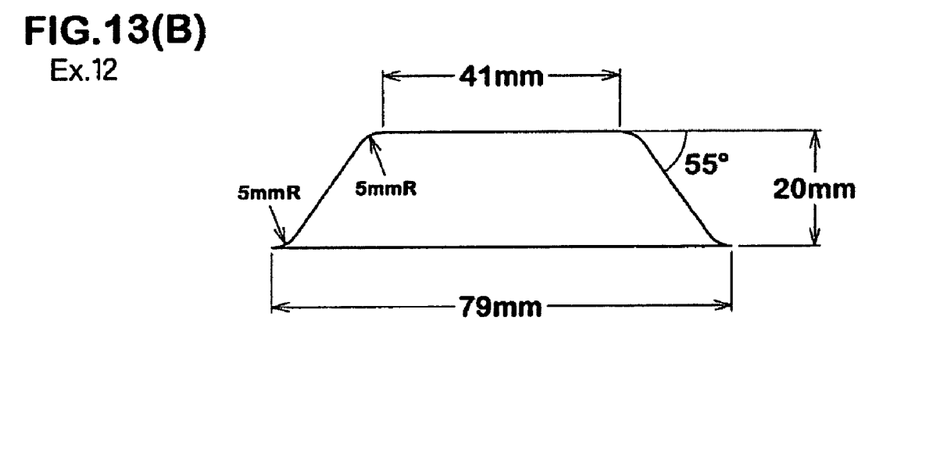
Figure 13C:
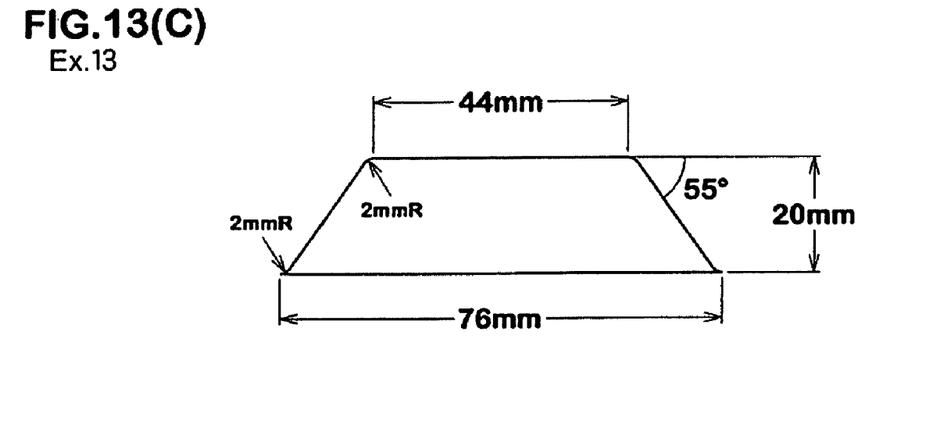
Figure 14:
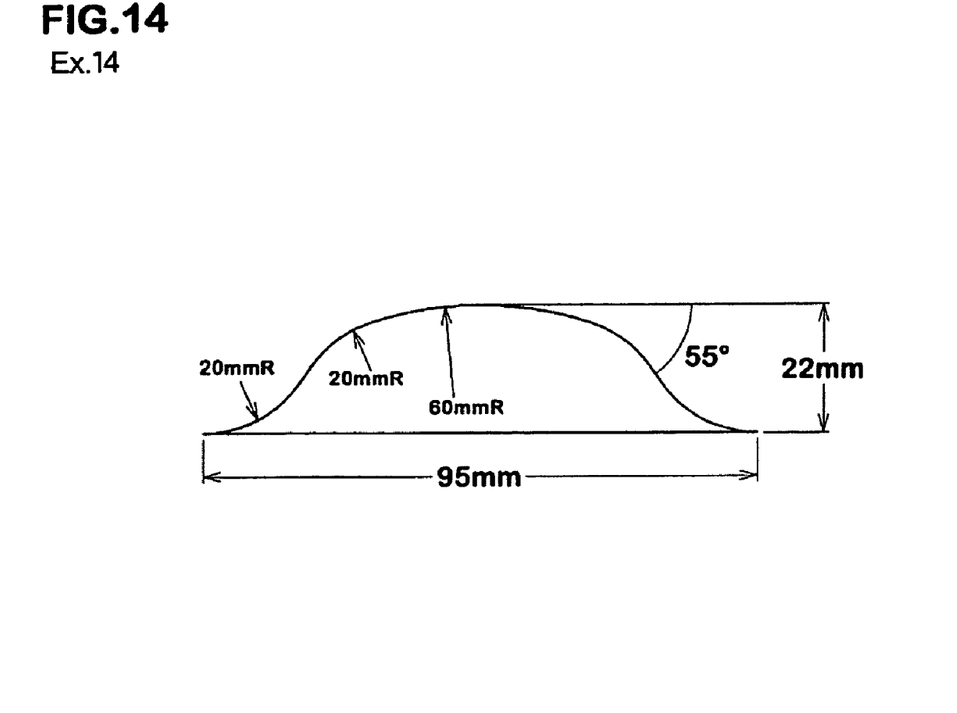
FIG. 14 shows a cross sectional view of a damper (Ex. 14) used in the comparison tests.
Figure 15:
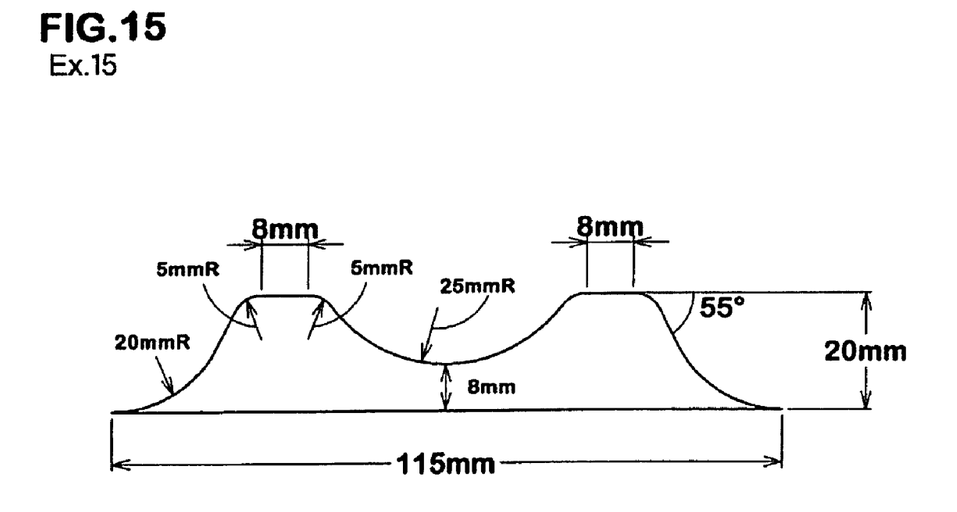
FIG. 15 shows a cross sectional view of a damper (Ex. 15) used in the comparison tests.
Figure 16A:
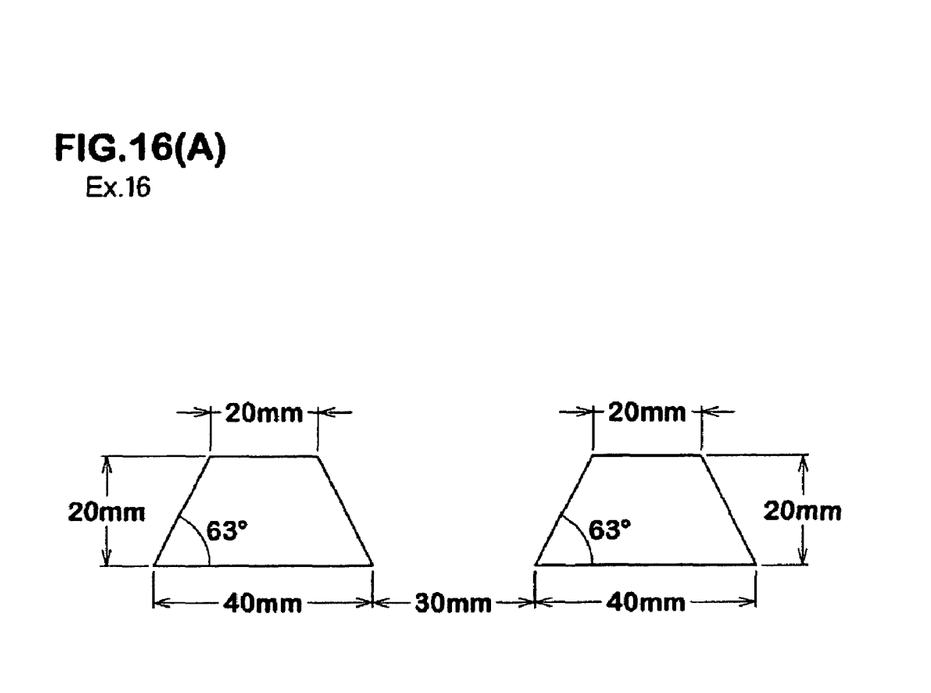
FIGS. 16(A) and 16(B) show cross sectional views of a pair of parallel dampers (Ex. 16 and Ex. 17) used in the comparison tests.
Figure 16B:
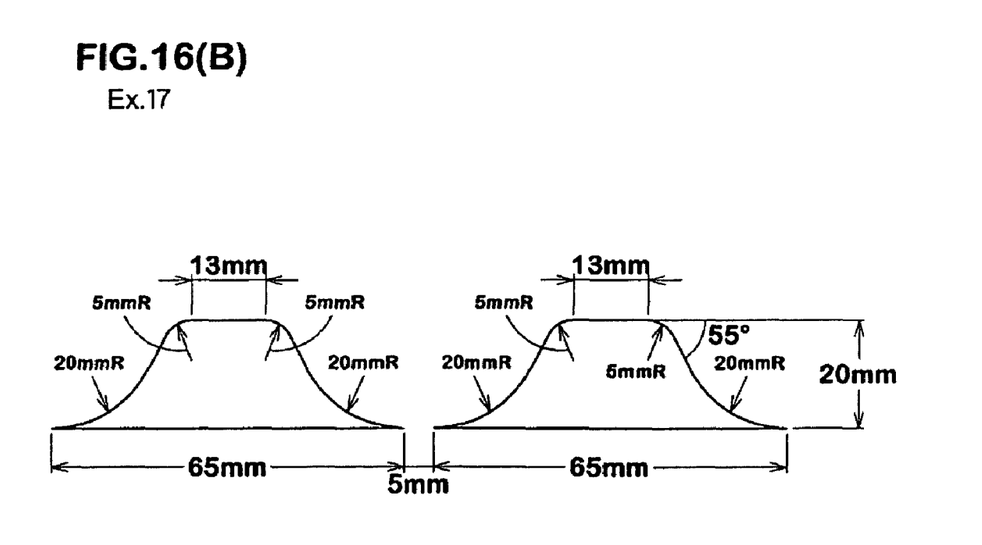

Aside from the above-mentioned combination of the three parts L1, L2 and L3 as shown in FIG. 7 and additionally in FIGS. 13(A)-13(C) and 16(B), the aslant portion 10 may be:

- a combination of the convexly curved part L2 on the top end surface 4B side and the relatively large straight part L3 extending from the edge of the base end surface 4A as shown in FIGS. 11(A)-11(C);
- a combination of the concavely curved part L1 extending from the edge of the base end surface 4A and the relatively large straight part L3 on the top end surface 4B side as shown in FIGS. 12(A)-12(C);
- a combination of the concavely curved part L1 and convexly curved part L2 only as shown in FIG. 14 and FIG. 15;
- the concavely curved part L1 only; or
- the convexly curved part L2 only.

Figure 10:
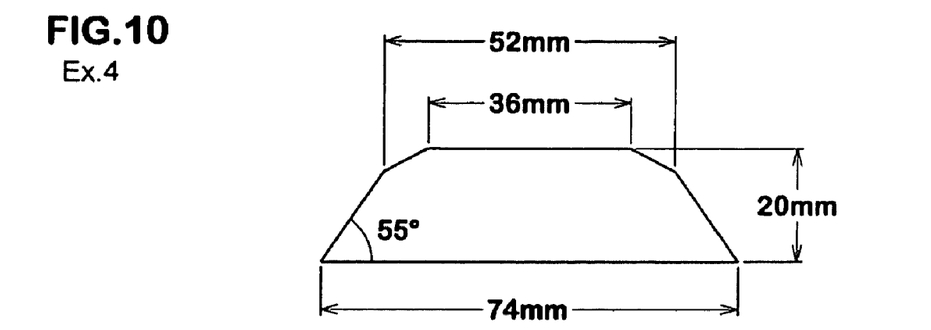
FIG. 10 shows a cross sectional view of a damper (Ex. 4) used in the comparison tests.

Further, as shown in FIG. 10, the side face 4c can be an aslant portion 10 made up of two straight parts each inclined at an angle within the above-mentioned range.

In any case, the angle theta of the aslant portion 10 must be in the above-mentioned range of 30 to 75 degrees. If the angle theta is less than 30 degrees, in order to obtain the necessary thickness and volume, the base end surface 4A of the damper becomes very wide in the nature of things. Therefore, if the edges of the damper 4 approach to the sidewall portion where large bending deformations occur, the durability deteriorates, and the labor and cost for the fixing work increase. If the angle theta is more than 75 degrees, the inroad increases and the damage is liable to occur.

For various contours of the side face 4c including the straight aslant portion, the curved aslant portion and the hybrid thereof, the inclination angle of a straight line drawn between the edge of the fixed base end surface 4A and the edge of the top end surface 4B is preferably limited in the above-mentioned same range as that for the angle theta.

Figure 8:
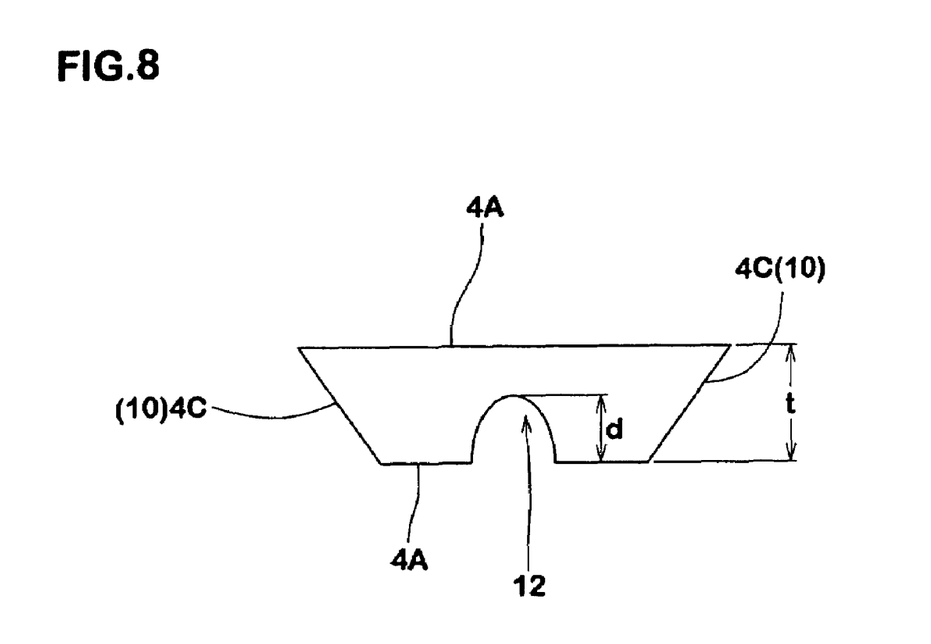
Figure 9A:
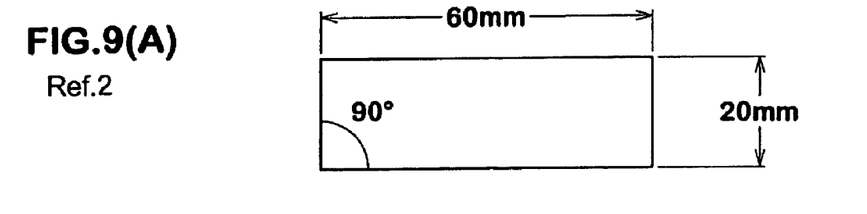
FIGS. 9(A), 9(B), 9(C), 9(D) and 9(E) show cross sectional views of dampers (Refs. 1 and 2 and Exs. 1, 2 and 3) used in the undermentioned comparison tests.
Figure 9B:
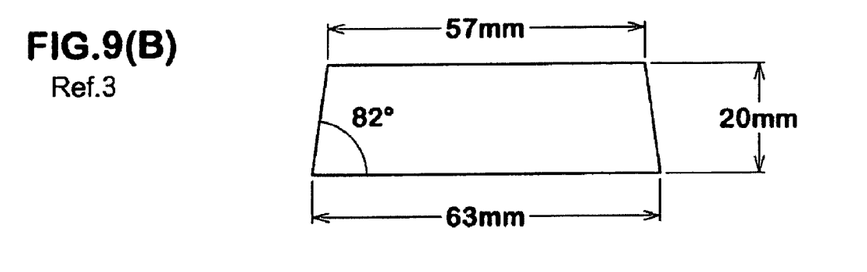
Figure 9C:
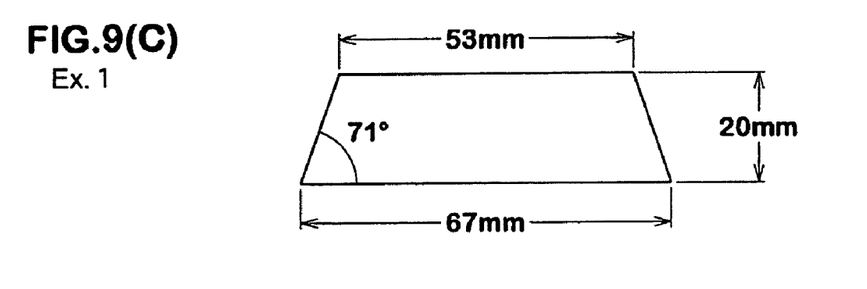
Figure 9D:
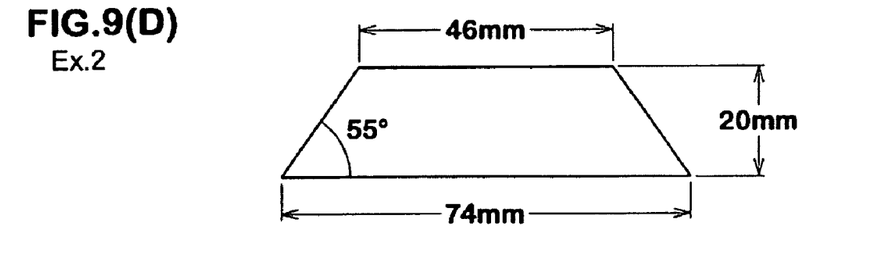
Figure 9E:
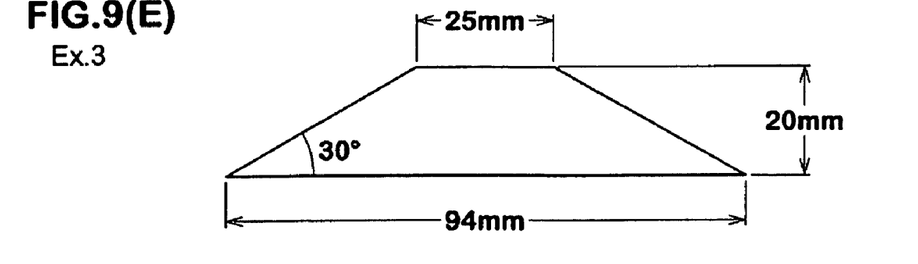

In any combination with the above-mentioned various aslant portions 10, it is possible that the damper 4 is provided with at least one groove 12 extending along the length thereof or circumferentially of the tire as shown in FIG. 8 for example. In the case of a single groove 12, the groove 12 is disposed in the center of the width as shown in FIG. 8.

As shown in FIG. 5, the tip end of the tire lever moves toward the direction X when demounting the tire and toward the direction Y when mounting the tire on the rim 2. If the tip end of the tire lever contacts with one of the side faces 4c of the damper 4, the damper 4 is pushed toward the center thereof and deformed. By providing the groove 12, the deformation is increased, and the tire lever will have a very small thrust into the damper 4. Thus, the damage can be fully or almost prevented.

For this purpose, the depth (d) of the groove 12 is preferably set in the range of more than 20%, more preferably more than 30%, but less than 100%, more preferably less than 70% of the maximum thickness (t) of the damper 4.

Further, as the groove 12 increases the surface area of the damper 4, the air resonance can be further reduced. Furthermore, as the outgoing heat radiation increases, the thermal degradation and deterioration in the adhesion strength may be prevented.

In order to fix the damper 4 to the inner surfaces of the tire and wheel rim, various means may be employed. For example, screws, mounting bracket and the like may be used to fix the damper to the rim. On the other hand, in the case of the damper fixed to the tire, it is possible to integrate the damper and the tire through the tire vulcanization process. However, for the cost and easiness in the fixing work, an adhesive agent, double-face adhesive tape and the like are preferably used alone or in combination. In the embodiment, therefore, the damper 4 is fixed to the tire inner surface 3i with a pressure sensitive adhesive double coated tape.

In the above-mentioned embodiment, a single damper is fixed to the inside of the tire tread portion. But, it is also possible to provide two or more dampers arranged axially in parallel with each other and fixed to the inside of the tire tread portion. In this case, it will be preferable that the dampers are arranged symmetrically about the tire equator.

Further, a damper 4 can be formed by applying a relatively narrow strip to the inner surface spirally in plural turns abutting or not abutting the edges. Furthermore, the damper may be formed by arranging small pieces of the material discontinuously in the circumferential direction.

Comparison Tests

Test tires having the same structure except for the damper structure were prepared, and noise performance test and tire demount test were conducted.

The tires used were a low-aspect radial tire of size 215/45ZR17 for passenger cars. The size of the wheel rims was 17×73. The volume of the closed tire cavity was 28,980 cc.

The noise damper was formed by applying a strip of an ether based polyurethane sponge (MARUSUZU K. K., Product code E16) having a specific gravity of 0.016. The length of the damper was 1900 mm which corresponded to the angle delta (FIG. 3) of 350 degrees, and the circumferential ends were tapered at 45 degrees as shown in FIG. 3. The cross sectional shapes of the dampers are shown in FIGS. 9 to 16, wherein the units of the thickness, width and radius are is millimeter. The damper was secured to the tire inner surface on the inside of the tread with a double-sided adhesive tape (Nitto Denko Corp. Product code 5000NS). In order to provide a smooth bonding surface to the tire, a bladder with a smooth surface was used in vulcanizing the tire.

*Noise Performance Test:

A Japanese 3000 cc FR passenger car provided on all the four wheels with test tires (tire pressure 200 kPa) was run on a noise test course with a rough asphalt paved surface, and during running at a speed of 60 km/hr, noise sound was measured in the inside of the car. The measuring position was near the driver's ear on the outside or window side of the car. Measured was the sound pressure level of a peak occurring at a frequency near 230 Hz—this frequency corresponds to that of the primary resonance mode of the annular air mass in the tire cavity.

The results are indicated in Table 1, using the difference (reduction) from that with no damper.

*Tire Demount Test:

using a tire changer (Model: WING320 manufactured by EIWA CO., LTD.) and a tire lever, the tires were demounted by twenty workers. The number of damages occurred on the damper, and the number of separations occurred between the damper and the tire inner surface are shown in Table 1. The smaller the numbers, the better the results.

From the test results, it was confirmed that, by providing the aslant portion partially or wholly, in addition to the thickness limitation, the damage and separation can be effectively prevented. Further, by providing the convexly curved part L2 and/or the groove, the damage and separation can be further prevented.

TABLE 1

| Damper | Ref. 1 | Ref. 2 | Ref. 3 | Ex. 1 | Ex. 2 | Ex. 3 | Ex. 4 | Ex. 5 | Ex. 6 | Ex. 7 |
|---|---|---|---|---|---|---|---|---|---|---|
| Shape | — | FIG. 9 (A) | FIG. 9 (B) | FIG. 9 (C) | FIG. 9 (D) | FIG. 9 (E) | FIG. 10 | FIG. 11 (A) | FIG. 11 (B) | FIG. 11 (C) |
| Damper volume Vs (cu · cm) | — | 2242 | 2249 | 2245 | 2242 | 2217 | 2202 | 2180 | 2238 | 2242 |
| Vs/V (%) *1 | — | 7.7 | 7.8 | 7.7 | 7.7 | 7.7 | 7.6 | 7.5 | 7.7 | 7.5 |
| Noise reduction (dB) | 0 | 8.4 | 8.3 | 8.3 | 8.4 | 8.1 | 8.3 | 8.1 | 8.3 | 8.4 |
| Number of damages | — | 6 | 7 | 4 | 3 | 2 | 2 | 2 | 2 | 3 |
| Number of separations | — | 2 | 2 | 1 | 0 | 0 | 0 | 0 | 0 | 0 |

| Damper | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Shape | FIG. 12 (A) | FIG. 12 (B) | FIG. 12 (C) | FIG. 13 (A) | FIG. 13 (B) | FIG. 13 (C) | FIG. 14 | FIG. 15 | FIG. 16 (A) | FIG. 16 (B) |
| Damper volume Vs (cu · cm) | 2301 | 2245 | 2242 | 2242 | 2242 | 2242 | 2322 | 2402 | 2227 | 2404 |
| Vs/V (%) *1 | 7.9 | 7.7 | 7.7 | 7.7 | 7.7 | 7.7 | 8 | 8.3 | 7.7 | 8.3 |
| Noise reduction (dB) | 8.5 | 8.4 | 8.3 | 8.4 | 8.2 | 8.3 | 8.6 | 8.8 | 8.3 | 8.8 |
| Number of damages | 1 | 2 | 3 | 1 | 2 | 3 | 1 | 1 | 3 | 1 |
| Number of separations | 0 | 0 | 0 | 0 | 0 | 0 | 0 | 0 | 1 | 0 |

*1 Cavity volume V = 28,980 cu · cm

The invention claimed is:

1. A tire noise reducing system comprising
a wheel rim,
a pneumatic tire mounted on the wheel rim and forming a tire cavity, and
a noise damper disposed in the tire cavity and made from a sponge material whose total volume is in a range of from 0.4 to 20 % of a volume of the tire cavity, wherein
the damper has a base end surface fixed to the inside of a tread portion of the tire and a top end surface opposite the base end surface, and
in a tire meridian section,
a maximum thickness of the damper between the base end surface and the top end surface is in a range of from 1.0 to 4.5 cm,
the width of the base end surface is more than the maximum thickness,
the width of the damper is not increased in the direction from the base end surface to the top end surface, and
each of side faces of the damper defined as extending from the edges of the base end surface to the edges of the top end surface is at least partially provided with an aslant portion inclined at an angle of from 30 to 75 degrees with respect to the base end surface, wherein
at least a part of said aslant portion is curved concavely.

2. The tire noise reducing system according to claim 1, wherein the aslant portion extends over the entirety of the side face.

3. The tire noise reducing system according to claim 1, wherein the damper is provided in the top end surface with a groove extending along the length of the damper.

4. The tire noise reducing system according to claim 2, wherein the damper is provided in the top end surface with a groove extending along the length of the damper.

5. The tire noise reducing system according to claim 1, 2, 3 or 4, wherein the aslant portion further includes a part which is substantially linear in the tire meridian section.

6. The tire noise reducing system according to claim 1, 2, 3 or 4, wherein the aslant portion further includes a part which is, in the tire meridian section, curved convexly.

7. A low-noise pneumatic tire comprising
a tread portion,
a pair of sidewall portions,
a pair of bead portions, and
a noise damper made from a sponge material and having a base end surface fixed to the inside of the tread portion and a top end surface opposite the base end surface, wherein
the width of the damper is not increased in the direction from the base end surface to the top end surface,
a maximum thickness of the damper between the base end surface and top end surface is in a range of from 1.0 to 4.5 cm,
the base end surface has a width of more than the maximum thickness, and
side faces of the damper defined as extending from the edges of the base end surface to the edges of the top end surface are each provided with an aslant portion inclined at an angle of from 30 to 75 degrees with respect to the base end surface, wherein
in the meridian section of the tire, at least a part of said aslant portion is curved concavely.

8. The low-noise pneumatic tire according to claim 7, wherein the aslant portion extends over the entirety of the side face.

9. The low-noise pneumatic tire according to claim 7, wherein the damper is provided in the top end surface with a groove extending along the length of the damper.

10. The low-noise pneumatic tire according to claim 8, wherein the damper is provided in the top end surface with a groove extending along the length of the damper.

11. The low-noise pneumatic tire according to claim 7, 8, 9 or 10, wherein the aslant portion further includes a part which is substantially linear in the tire meridian section.

12. The low-noise pneumatic tire according to claim 7, 8, 9 or 10, wherein the aslant portion further includes a part which is, in said meridian section of the tire, curved convexly.

* * * * *